United States Patent
Martinez-Botas et al.

(10) Patent No.: US 10,161,302 B2
(45) Date of Patent: Dec. 25, 2018

(54) VARIABLE FLOW-RESTRICTING TURBINE ASSEMBLY FOR A TURBOCHARGER, CORRESPONDING TURBOCHARGER ENGINE AND VEHICLE, AND OPERATING METHOD

(71) Applicant: Imperial Innovations Limited, London (GB)

(72) Inventors: Ricardo Martinez-Botas, Middlesex (GB); Harminder Flora, Berkshire (GB); Srithar Rajoo, Nusajaya JB (MY); Apostolos Pesiridis, London (GB); Colin Copeland, Bristol (GB)

(73) Assignee: Imperial Innovations Limited, London (GB)

( * ) Notice: Subject to any disclaimer, the term of this patent is extended or adjusted under 35 U.S.C. 154(b) by 82 days.

(21) Appl. No.: 14/891,291

(22) PCT Filed: May 13, 2014

(86) PCT No.: PCT/GB2014/051466
§ 371 (c)(1),
(2) Date: Nov. 13, 2015

(87) PCT Pub. No.: WO2014/184542
PCT Pub. Date: Nov. 20, 2014

(65) Prior Publication Data
US 2016/0084156 A1    Mar. 24, 2016

(30) Foreign Application Priority Data
May 14, 2013  (GB) .................................. 1308680.6

(51) Int. Cl.
*F02D 23/00*    (2006.01)
*F01D 17/14*    (2006.01)
(Continued)

(52) U.S. Cl.
CPC ................ *F02B 37/24* (2013.01); *F01D 5/02* (2013.01); *F01D 9/041* (2013.01); *F01D 17/14* (2013.01);
(Continued)

(58) Field of Classification Search
CPC .......... F02B 37/24; F02B 33/40; F02B 37/22; F02B 39/04; F02B 39/10; F02B 39/12;
(Continued)

(56) References Cited

U.S. PATENT DOCUMENTS 279,981 A * 6/1883 Raab .......................... F03B 3/00
  415/166
588,501 A * 8/1897 Stilwell ...................... F01D 3/02
  415/166
(Continued)

FOREIGN PATENT DOCUMENTS

EP  808992 A2 * 11/1997 ........... F01D 17/167
EP  2103793 A2  9/2009
(Continued)

OTHER PUBLICATIONS

"International Search Report and Written Opinion of the International Searching Authority"; issued in International Application No. PCT/GB2014/051466 dated Jul. 7, 2014.

*Primary Examiner* — Thai Ba Trieu
(74) *Attorney, Agent, or Firm* — Kaplan Breyer Schwarz, LLP

(57) ABSTRACT

A variable flow-restricting turbine assembly for a turbocharger includes a housing, a turbine mounted for rotation in the housing, and a variable flow-restrictor. The variable flow-restrictor includes a first series of angularly-distributed flow-restrictor portions distributed around the turbine wheel and located in an exhaust flow path to the wheel, and a second series of angularly-distributed flow-restrictor por-
(Continued)

Rotating Vane Array Turbocharger principle of active flow control operation tions distributed around the first series and located in the exhaust path. At least one of the first and second series is rotatable in the housing to vary the relative angular positions of the first and second series. The restrictor portions are arranged such that the first portions align with the second portions at each of a plurality of relative angular positions to open flow channels between the portions and such that they misalign between those positions to close the flow channels.

14 Claims, 4 Drawing Sheets

(51) Int. Cl.
　　　F02B 37/24　　(2006.01)
　　　F02D 41/00　　(2006.01)
　　　F02B 37/22　　(2006.01)
　　　F01D 5/02　　(2006.01)
　　　F01D 9/04　　(2006.01)
　　　F02B 33/40　　(2006.01)
　　　F02B 39/04　　(2006.01)
　　　F02D 41/14　　(2006.01)
(52) U.S. Cl.
　　　CPC ............ *F01D 17/148* (2013.01); *F02B 33/40* (2013.01); *F02B 37/22* (2013.01); *F02B 39/04* (2013.01); *F02D 41/0007* (2013.01); *F02D 41/1445* (2013.01); *F02D 41/1448* (2013.01); *F05D 2220/40* (2013.01); *F05D 2260/962* (2013.01); *Y02T 10/144* (2013.01)
(58) Field of Classification Search
　　　CPC . F01D 5/02; F01D 9/041; F01D 17/14; F01D 17/148; F02D 41/0007; F02D 41/1448; F02D 2260/962; F05D 2220/40; Y02T 10/144
　　　USPC ............................ 60/602; 415/159–164, 166
　　　See application file for complete search history.

(56) References Cited

U.S. PATENT DOCUMENTS

| | | | | |
|---|---|---|---|---|
| 1,771,711 | A * | 7/1930 | Hahn | F04D 29/466 415/161 |
| 3,137,477 | A * | 6/1964 | Kofink | F01D 9/045 415/166 |
| 3,162,421 | A * | 12/1964 | Schwarz | F01D 17/167 415/166 |
| 3,756,739 | A * | 9/1973 | Boussuges | F04D 29/466 415/161 |
| 4,497,618 | A | 2/1985 | Anderson et al. | |
| 5,372,485 | A | 12/1994 | Sumser et al. | |
| 5,454,225 | A * | 10/1995 | Sumser | F01D 17/165 415/166 |
| 8,627,660 | B2 * | 1/2014 | Ito | F02D 41/0007 60/602 |
| 8,683,799 | B2 * | 4/2014 | Azuma | F01D 17/165 60/602 |
| 8,702,381 | B2 * | 4/2014 | Alajbegovic | F01D 17/165 415/166 |
| 2011/0072815 | A1 * | 3/2011 | Pesiridis | F02D 41/0007 60/615 |
| 2011/0243721 | A1 * | 10/2011 | Alajbegovic | F01D 17/165 415/204 |
| 2013/0152583 | A1 * | 6/2013 | Uesugi | F01D 17/165 60/608 |

FOREIGN PATENT DOCUMENTS

| | | |
|---|---|---|
| EP | 2522838 A1 | 11/2012 |
| EP | 2522839 A2 | 11/2012 |
| EP | 3075962 A1 * 10/2016 ........... F01D 17/167 |
| GB | 2461720 A | 1/2010 |
| JP | 2011127530 A * 6/2011 |
| WO | 2006061588 A1 | 6/2006 |
| WO | 2008129274 A2 | 10/2008 |

* cited by examiner

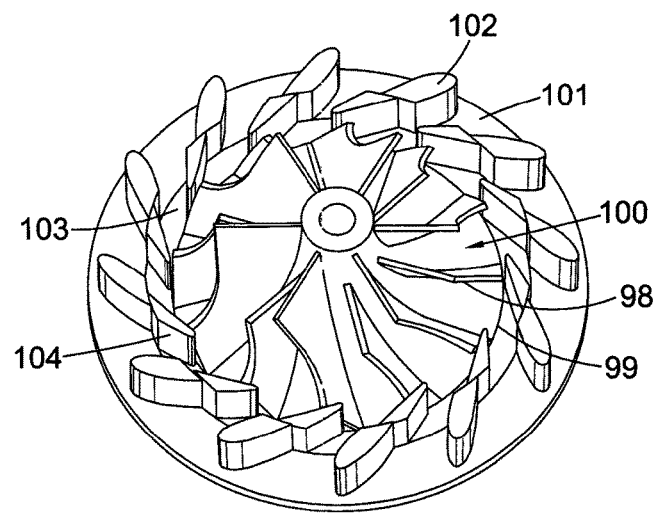
Fig. 2
Rotating Vane Array Turbocharger main components
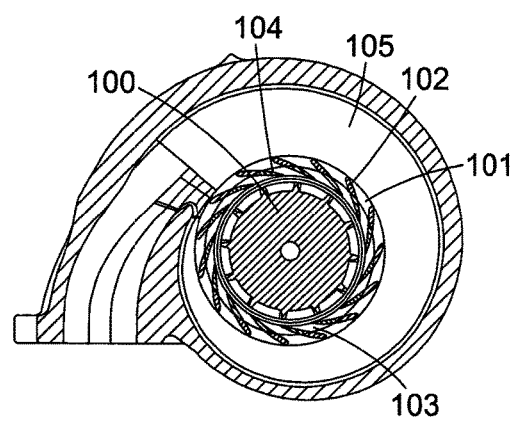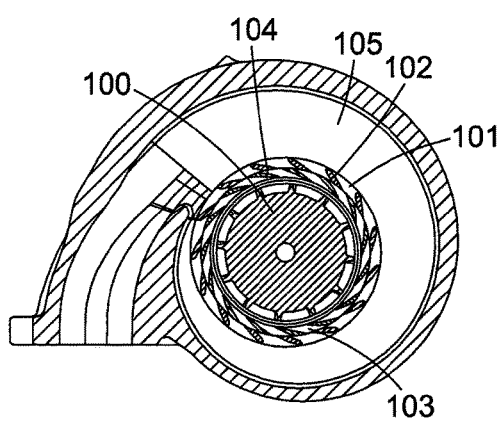
Fig. 3(a)     Fig. 3(b)
Rotating Vane Array Turbocharger with vanes (a) in the fully open position and (b) in the fully closed position Rotating Vane Array Turbocharger principle of active flow control operation

VARIABLE FLOW-RESTRICTING TURBINE ASSEMBLY FOR A TURBOCHARGER, CORRESPONDING TURBOCHARGER ENGINE AND VEHICLE, AND OPERATING METHOD

CROSS REFERENCE TO RELATED APPLICATIONS

This application is a national phase of PCT application No. PCT/GB2014/051466, filed 13 May 2014, which claims priority to GB patent application No. 1308680.6, filed 14 May 2013, all of which are incorporated herein by reference.

FIELD

This invention relates to a turbine assembly for a turbocharger. In embodiments, it also relates to a turbocharger comprising the assembly, to an engine comprising the turbocharger and to a vehicle comprising the engine. It also relates to a method of operating the turbine assembly.

BACKGROUND

Existing turbochargers for gasoline and diesel internal combustion engines make use of the heat and volumetric flow of exhaust gas exiting the engine for pressurising an intake air stream, that is routed to a combustion chamber of the engine. Specifically, the exhaust gas exiting the engine is routed into a turbine housing of a turbocharger in a manner that causes an exhaust-gas-driven turbine to spin within the housing. The turbine is mounted on one end of a shaft that is common to a radial air compressor mounted on the other end of the shaft. Thus, rotary action of the turbine also causes the air compressor to spin within a compressor housing of the turbocharger that is separate from the exhaust housing. The spinning action of the air compressor causes intake air to enter the compressor housing and be pressurized a desired amount before it is mixed with fuel and combusted within an engine combustion chamber.

The amount by which the intake air is pressurized is controlled by regulating the amount of exhaust gas that is passed through the turbine housing by a wastegate and/or by selectively opening or closing an exhaust gas channel or passage to the turbine. Turbochargers that are constructed having such adjustable exhaust gas channels are referred to as variable geometry turbines (VGTs), variable nozzle turbines (VNTs), variable turbine geometries (VTGs) or variable flow turbines (VFTs). The most common abbreviation is VGT. VGTs typically include a movable member that is positioned within a turbine housing between the exhaust gas source and the turbine. The movable member is actuated from outside the turbine housing by a suitable actuating mechanism to increase or decrease the volumetric flowrate of exhaust gas to the turbine such that it is appropriate for by the current engine operating conditions. Increasing or decreasing the volumetric flowrate of exhaust gas to the turbine respectively increases or decreases the intake air boost pressure generated by the compressor mounted on the other end of the turbine shaft.

VGTs can operate with an internal combustion engine when the engine is in either steady state (wherein engine operating parameters, such as engine rotation speed and load, are of constant magnitude) or transient operating mode (wherein such engine operating parameters are changing in magnitude). However, a feature of the internal combustion engine is the periodic nature of its operation: air-charge intake and compression, combustion, expansion and exhaust events all taking place sequentially and repeatedly. Individual exhaust gas pulses are emitted by the internal combustion engine during exhaust events through the opening of the engine exhaust valves and are channeled through a manifold pipe assembly into the turbocharger turbine inlet casing. The frequency of the emitted exhaust pulses is significant and generally lies within a range of 20-200 Hz in modern gasoline and diesel engines. The operation of typical engine exhaust valves is such that during an exhaust event, large amplitudes of gas mass-flow and pressure are observed starting with low values immediately after the valves open, reaching a peak usually before the first half of the valve open period, with the gas flow then dissipating to approximately the same conditions as at the start of the process. This highly pulsating flow is driven directly to the turbine through an exhaust manifold and the turbine housing. VGT nozzles assume an optimum nozzle position providing an optimum area and therefore optimum volumetric flow rate for any given engine exhaust gas condition, but do not account for the large variations in the characteristics of the flow through each engine exhaust pulse.

It is known that the energy contained within each exhaust gas pressure pulsation event when the engine is running in steady state mode is substantial. A method to control the energy content, velocity magnitude and direction of these pulses by opening and closing of the area available to them at the inlet to the turbine rotor by means of an adjustable area-control flow restrictor mechanism can provide substantial gains in turbocharger and engine performance. Systems and methods to take advantage of this energy are described in each of WO2006/061588 and WO2008/129274 for which the lead inventor is common with the present disclosure. Using these approaches, the energy recovered during each exhaust event can raise the amount of energy absorbed by the turbine. This allows more power to be extracted by the turbocharger for the same engine operating conditions.

In order to effect the flow control of WO2006/061588 and WO2008/129274, the selected flow control system needs to provide means which cause the opening and closing of a sliding sleeve-type flow restrictor or which open and close a set of radially arranged pivoting vanes. This action is effected by linear displacement and translated by suitable mechanical linkage means into oscillating motion at the flow control end of the mechanism inside the flow gas passage channel in the turbine housing. The fact that a continuous oscillatory, periodic motion is required at high frequencies causes a build-up of a number of adverse mechanical engineering problems in the design. These can include fatigue stress and fretting between the high frequency operated surfaces of the movable components in contact to one another. Solutions to the problems imposed by these phenomena call for expensive choices in materials selection and for actuator and control means of substantial power output. As this power must be taken from the engine itself, this offsets the net benefit created by the installation of these devices.

Attractive solutions to these problems therefore remain elusive.

SUMMARY

In an effort to increase the reliability and net power and efficiency benefit to the turbocharger and to the engine, there is provided, in general terms a system to provide rotational means of flow area control per pulse at the turbine inlet rather than oscillatory means of flow control per pulse at the turbine inlet. The actual goal of enhanced energy recovery per pulse is generally maintained and is similar to that WO2006/061588 and WO2008/129274, but at a significantly enhanced level of reliability, power consumption reduction and ultimately ease of industrialisation and production.

According to a first aspect of this invention there is provided a variable flow-restricting turbine assembly for a turbocharger, the assembly comprising a housing, a turbine mounted for rotation in the housing, and a variable flow-restrictor; wherein the variable flow-restrictor comprises a first series of angularly-distributed flow-restrictor portions distributed around the turbine wheel and located in an exhaust flow path to the wheel, and a second series of angularly-distributed flow-restrictor portions distributed around the first series and located in the exhaust path, at least one of the first and second series being rotatable in the housing to vary the relative angular positions of the first and second series, and the restrictor portions arranged such that the first portions align with the second portions at each of a plurality of relative angular positions to open flow channels between the portions and such that they misalign between those positions to close the flow channels.

The flow channels may not close completely between the relative angular positions in which the first and second series of restrictor portions are in alignment. Thus, it may be considered that the area of the flow-path defined by the portions increases towards aligned positions and reduces between those positions. This area may be at a maximum when the series are substantially aligned and at a minimum substantially half-way between each aligned position.

The first series of flow-restrictor portions may be termed the "first portions". The second series of flow-restrictor portions may be termed the "second portions". The first portions and the second portions may each be sections of an aerofoil (that is, an "airfoil" in US English). The second portions may each be a leading part of an aerofoil section. The first portions may each be a trailing part of an aerofoil section. The leading parts and trailing parts may be of the same aerofoil section. The first and second portions may be arranged such that when in alignment each first portion aligns with a respective second portion to form a respective aerofoil section. The flow channels may be defined between adjacent aerofoil sections. In other embodiments, the first portions and/or the second portions may not be sections of an airfoil. Instead they may be conceivably any shape that acts to control the flow based on their relative positions.

There may be the same number of first portions and second portions.

The first series may be rotatable in the housing and/or the second series may be rotatable in the housing. The or each series may be rotatable coaxially with the wheel. The at least one of the first and second series that is rotatable in the housing may be mounted on a carrier for rotation. The carrier may be a disc. The carrier may be mounted for coaxial rotation with the wheel. If a series is not rotatable in the housing, it may be fixed to the housing. If a series is not rotatable, it may be mounted to a carrier that is fixed to the housing.

The at least one of the first and second series that is rotatable in the housing may be coupled to actuator means arranged to rotate the or each series. The rotation may be continuous rotation in one direction. The actuator means may comprise a mechanical coupling assembly coupled to a rotating part of an engine to which the turbocharger is to be coupled, the mechanical coupling assembly arranged to drive the or each series from the rotating part. The rotating part may be, for example, the crankshaft or a camshaft. The mechanical coupling may comprise a chain-drive arrangement. The mechanical coupling may comprise a belt-drive arrangement. Mechanical couplings driven by the crankshaft or the camshaft of an engine are well known in the art and, therefore, are not shown. The actuator may comprise drive means other than the engine. The actuator may comprise an electromagnetic and/or an electromechanical actuator. The actuator may comprise an electric motor. The actuator may be a pneumatic or hydraulic actuator. Electromagnetic, electromechanical, electric motor, pneumatic and hydraulic actuators are all well known types of actuators and, therefore, are not shown.

The actuator may be arranged to drive the or each series at a frequency that is proportional to the frequency of exhaust pulses from the engine. The actuator may be arranged to drive the or each series such that the series are aligned with a frequency substantially equal to the frequency of exhaust pulses from the engine. The actuator may comprise a sensing system and a control system. The sensing system may be arranged to sense engine characteristics indicative of the timing and frequency of exhaust pulses, for example by sensing valve position and/or for example crankshaft position and optionally speed. The control system may be arranged to control speed and position of the at least one series that is driven by the actuator, based on the sensed engine characteristics. Such sensing and control systems are well known in the art and, therefore, are not shown.

The turbine assembly may comprise the actuator.

According to a second aspect of this invention, there is provided a method of operating a variable flow-restricting turbine assembly for a turbocharger as defined in the first aspect, the method comprising the step of rotating the at least one of the first and second series at a frequency that is substantially proportional to the frequency of exhaust pulses from an engine to which the assembly is coupled.

Optional features of the first aspect may be optional features of the second aspect. The method may include rotation the at least one series such that the series are aligned with a frequency substantially equal to the frequency of exhaust pulses from the engine. The method may comprise sensing engine characteristics indicative of the timing and frequency of exhaust pulses, for example by sensing valve position and/or for example crankshaft position and optionally speed. The method may comprise controlling the speed and position of the at least one series that is rotated, based on the sensed engine characteristics.

According to a third aspect of this invention, there is provided a turbocharger comprising the turbine assembly of the first aspect.

According to a fourth aspect of this invention, there is provided an engine comprising the turbocharger of the other aspect.

According to a fifth aspect of this invention, there is provided a vehicle comprising the engine of the further aspect.

In an embodiment, a system and method for providing active flow control of the pulsating exhaust gas flow at the inlet of a turbocharger turbine for use in internal combustion engines, provides an arrangement of two concentric discs with the first (or outer) disc containing the top (or leading edge) part of a radially arranged series of aerofoil sections and the second (or inner) disc containing the bottom (or trailing edge) part of a radially arranged series of aerofoil sections, within a turbine housing between a primary exhaust gas volute and turbine blades and actuated by a suitable actuator.

At least one of the discs can rotate about the turbine rotor shaft axis at a speed proportional to the frequency of the emitted engine exhaust gas pulses such that as the leading edge of the outer disc transcribes an arc from one aerofoil trailing edge (of the inner disc) to its adjacent aerofoil trailing edge, through rotational displacement of either the outer or inner disc or both, the available area for the exhaust flow to enter through and reach the turbine is gradually reduced to a minimum when the aerofoil leading is passing between a first and second aerofoil trailing edge gap and when the aerofoil leading edge reaches out and aligns itself exactly with the chord direction of the inner disc's adjacent aerofoil trailing edge the area available for the flow to pass through the disc system and to enter the turbine rotor is maximized. The rotational speed of the disc or discs (depending on whether both or only one of the two is rotatable) matches the passing frequency of the incoming exhaust gas pulses thus allowing active flow control of the exhaust volumetric flowrate to the turbine in the same manner as WO2006/061588 of 2006 and WO2008/129274 of 2008. The disc or discs are rotatable to the correct speed through either a suitable rotary actuator or by the synchronized drawing of power from the engine's crankshaft or camshaft through a chain driven arrangement of chain and toothed gears or a belt driven arrangement of belt and pulleys.

In the case of crank- or camshaft driven application the system is synchronized with engine operation and no sensors are required. In the case where a dedicated actuator is installed and drives the rotatable disc system sensors can be provided for measurement of mass flow rate and pressure levels at the inlet as well as additional engine sensors for crankshaft or camshaft position are provided with all the information routed to a controller which then undertakes to phase nozzle motion with the frequency of the exhaust pressure pulses.

Advantages of at least some embodiments include:
1. Providing means for periodic maximizing and minimizing of the turbine inlet flow area per pulse event by means of continuous rotation rather than by means of continuous oscillation of a mechanism (such as was the case with WO2006/061588 of 2006 and WO2008/129274 of 2008). This affords a far simpler and less structurally stressful operation leading to significantly enhanced reliability.
2. A smaller number of components making it easier to manufacture and less complicated to design.
3. Therefore less susceptibility to impurities, has less wear sites and is more suitable for continuous reliable operation.
4. Continuous rotational operation requires much less power to be consumed either by dedicated actuator means installed and connected to the rotatable portion of the disc system or by the engine if the system is connected to the engine crankshaft or camshaft and from which it draws power for rotation.

In an embodiment, there is provided a system and method for providing active flow control of the pulsating exhaust gas flow at the inlet of a turbocharger turbine for use in internal combustion engines. The system and/or method provides an arrangement of two concentric discs with the first (or outer) disc containing the top (or leading edge) part of a radially arranged series of aerofoil sections and the second (or inner) disc containing the bottom (or trailing edge) part of a radially arranged series of aerofoil sections, within a turbine housing between a primary exhaust gas volute and turbine blades and actuated by a suitable actuator. At least one of the discs can rotate about the turbine rotor shaft axis at a speed substantially proportional to the frequency of the emitted engine exhaust gas pulses such that as the leading edge of the outer disc transcribes an arc from one aerofoil trailing portion (of the inner disc) to its adjacent aerofoil trailing portion, through rotational displacement of either the outer or inner disc or both, the available area for the exhaust flow to enter through and reach the turbine is gradually reduced to a minimum when the aerofoil leading is passing between a first and second aerofoil trailing portion gap and when the aerofoil leading portion reaches out and aligns itself exactly with the chord direction of the inner disc's adjacent aerofoil trailing portion the area available for the flow to pass through the disc system and to enter the turbine rotor is maximized. The rotational speed of the disc or discs (depending on whether both or only one of the two is rotatable) substantially matches the passing frequency of the incoming exhaust gas pulses thus allowing flow control of the of the exhaust volumetric flowrate to the turbine. The disc or discs are rotatable to the correct speed through either a suitable rotary actuator or by the synchronized drawing of power from the engine's crankshaft or camshaft through, for example, a chain driven arrangement of chain and toothed gears or a belt driven arrangement of belt and pulleys.

Embodiments take into account the fact that high fatigue and creep stress cycles are obtained as a result of the reciprocating motion of the adjustable member of the two previously described embodiments and by providing a set of two concentric discs, where one is stationary and the other is rotating, with rigidly-attached aerofoil sections located around the circumference of both discs, the available passage area can be controlled by rotating motion of one of the two discs as their attached vanes pass between the array of vanes of the other disc thus acting to partially block the available passage area of the exhaust flow at the turbine inlet. As a result the oscillating motion of the adjustable members providing instantaneously variable turbine inlet exhaust flow is replaced by a rotating motion one of the two discs with the geometrical thickness of the vanes in the other disc serving as the means by which the passage area is controlled. By replacing an oscillatory motion of the adjustable members of the two previous embodiments with the rotating motion of the present embodiment a much simpler actuating means can be applied and the fatigue life of the adjustable channel members can be substantially increased.

BRIEF DESCRIPTION OF THE DRAWINGS

Embodiments of the invention will be described below, by way of example only, with reference to the accompanying drawings, in which:

FIG. 2 is a perspective view of a rotor and two discs of the turbine assembly;

FIG. 3a is a sectional view similar to FIG. 1 and showing the discs arranged such that flow-control vanes on the discs are in a fully open position;

FIG. 3b is a sectional view similar to FIG. 3, but showing the discs arranged such that the vanes are in a fully closed position.

DETAILED DESCRIPTION OF CERTAIN EXAMPLE EMBODIMENTS

The following embodiments relates generally to an exhaust gas driven turbocharger and, more particularly, to a variable-geometry turbine turbocharger. In these embodiments, the turbine contains an adjustable inlet flow control mechanism comprising a system of rotating discs controlled in such a way as to effect active flow control or the ability to control the flow characteristics of individual exhaust pulses in order to increase the available energy and efficiency of a turbocharger turbine. This is to increase overall internal combustion engine efficiency as the turbocharger is connected to, driven by and boosts an internal combustion engine. Embodiments differs from existing variable geometry arrangements in the following ways: most existing technologies do not offer an ability to control the flow characteristics of individual exhaust gas pulses and instead merely consider bulk (or mean) exhaust flow changes as a result of appreciable changes in the operating condition of the exhaust gas-supplying internal combustion engine. None of VGT, VTG, VFT or VNT offer the ability to vary the cross sectional area and/or direction of the flow at the frequency rates necessary to effect control of individual exhaust gas pulses. The importance of individual exhaust pulse flow control lies in the amount of energy fluctuation existent and the potential offered to increase turbine available energy and efficiency if means are provided to control these levels of energy fluctuation. Flow control arrangements that recognise this have been provided in WO2006/061588 of 2006 and WO2008/129274. Embodiments described herein are functionally different in that in offering the ability to control exhaust pulses through rotating rather than oscillating motion of an appropriate flow control mechanism.

Figure 1:
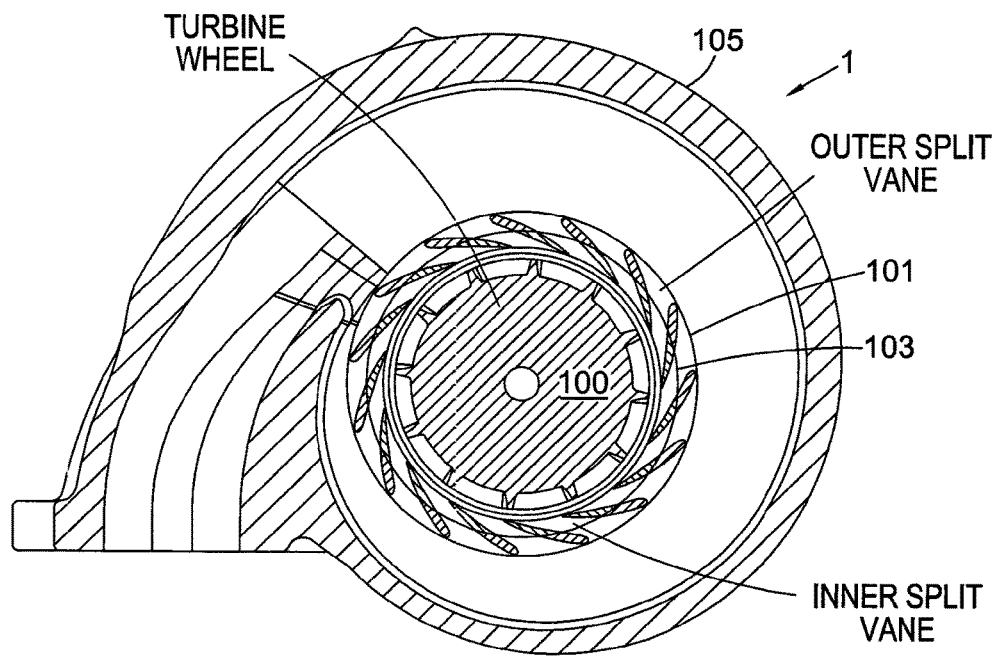
FIG. 1 is a sectional view of a turbine assembly for a turbocharger, the section being taken radially through the turbine assembly.

FIG. 1 shows in cross-section a turbine assembly 1 for a turbocharger (not shown in full) that amounts to an embodiment. The turbine assembly 1 includes a turbine housing 105 and a turbine rotor 100. The rotor 100 is arranged for radial flow, having body portion 99 with vanes 98 projecting axially and radially from it. The housing 105 and the rotor 100 are similar to the housing and rotor of an existing variable geometry turbocharger, but may be arranged, as will be understood with reference to the following description, to accommodate an inner turbine disc 103 and an outer turbine disc 101 of the turbine assembly 1, which are not present in existing turbochargers. The inner turbine disc 103 and the outer turbine disc 101 are positioned radially outside the turbine rotor 100.

Referring to FIG. 2, components of the turbine assembly 1, can be seen in more detail. As mentioned, the rotor 100 has two discs adjacent to it. Both of these discs are arranged co-axially with the turbine rotor 100 and are of greater radius than the rotor 100 so as to surround the rotor 100 in the radial direction. The inner disc 103 is radially adjacent the rotor 100 such that the inner circumference of the disc 103 is radially juxtaposed with the outer circumference of the rotor 100. The outer disc 101 is radially adjacent the inner disc 103 such that the inner circumference of outer disc 101 is radially juxtaposed with the outer circumference of the inner disc 103. The outer disc 103, inner disc 101 and rotor 100 are all arranged with minimal tolerance between them to ensure good flow of exhaust gasses.

Figure 4:
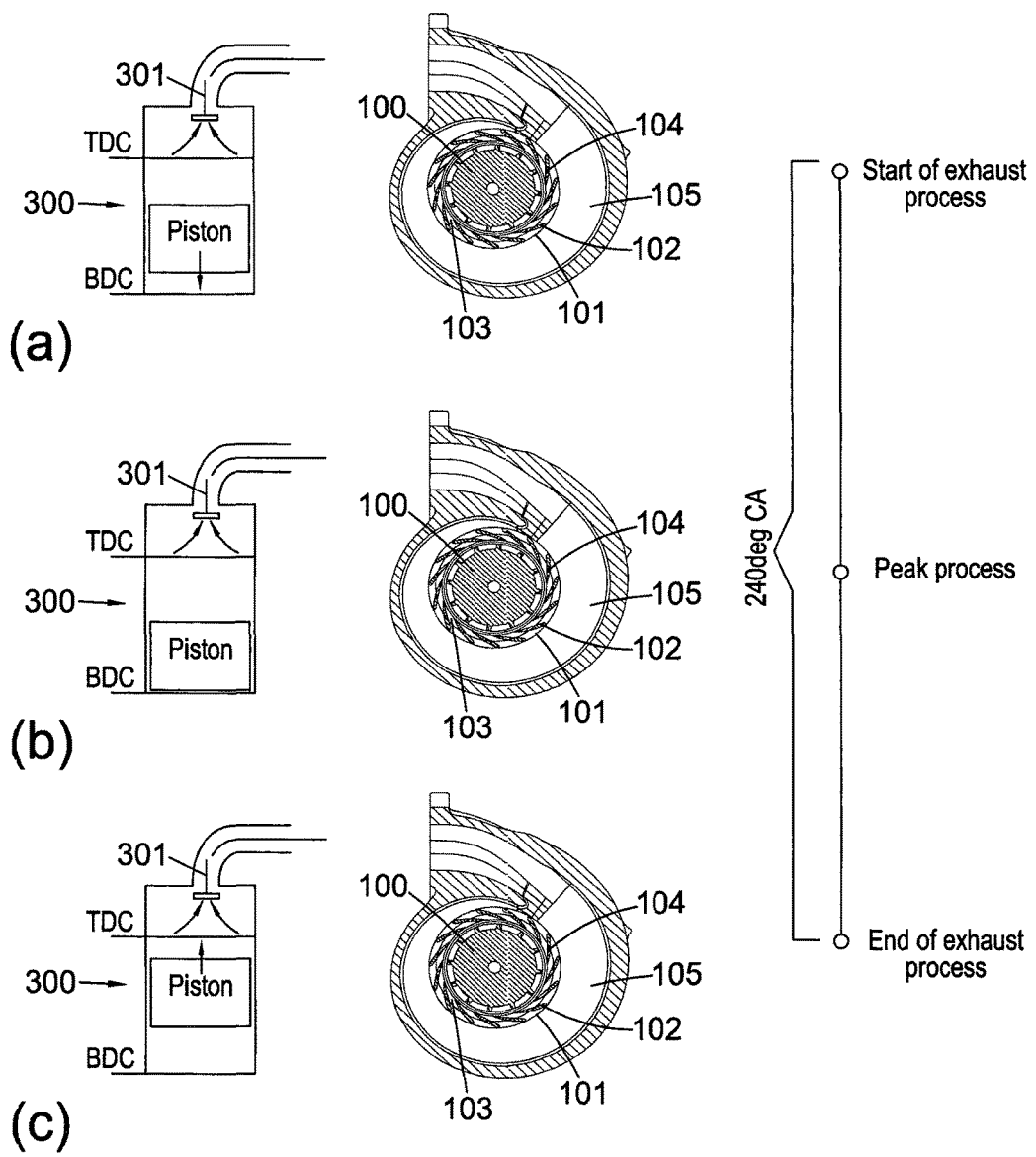
FIG. 4 shows the operation of the turbocharger based on the timing of engine events.
Figure 5:
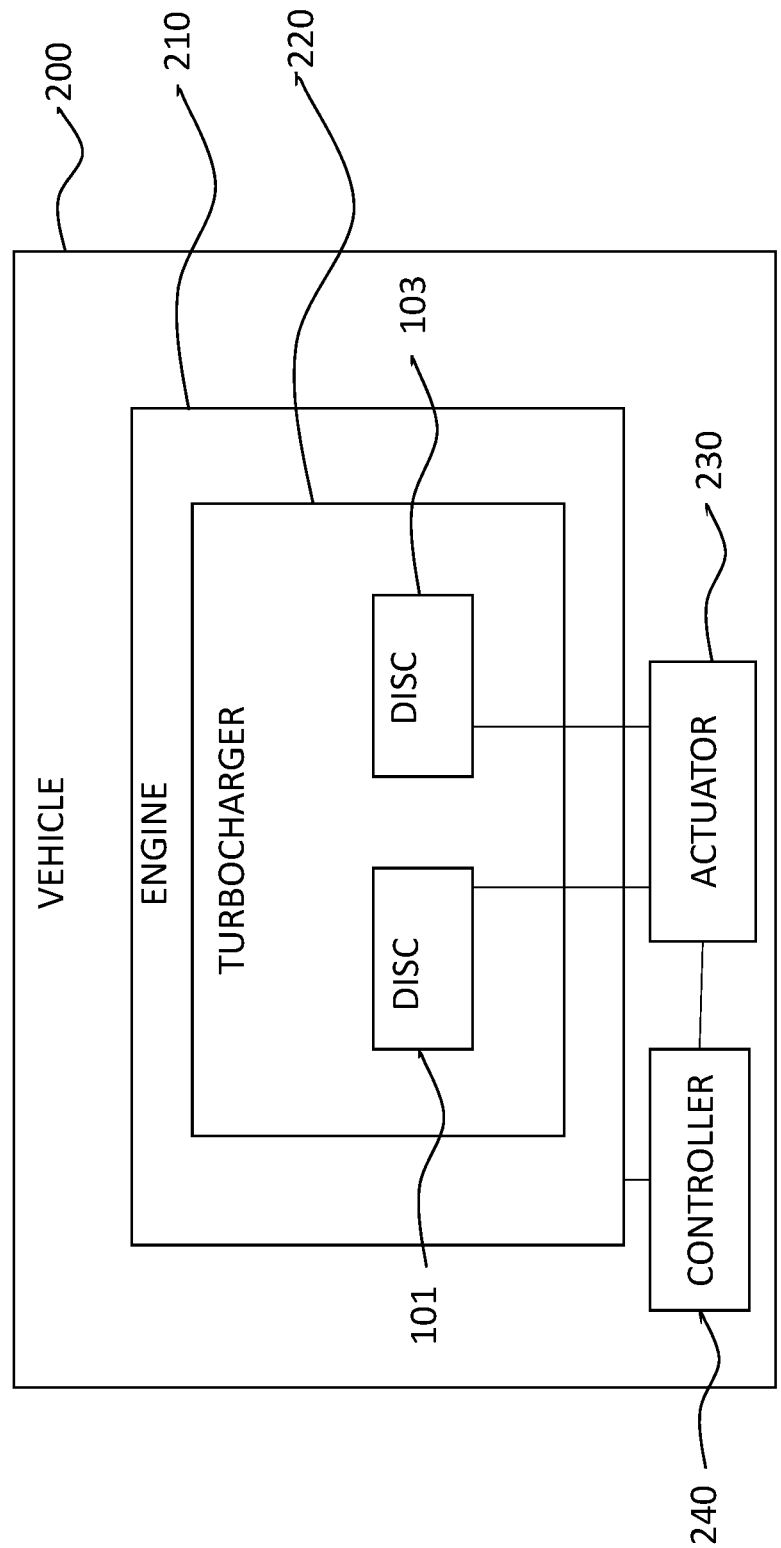
FIG. 5 shows a vehicle having an engine to which the turbocharger with the turbine assembly is fitted, an actuator for driving a variable flow-restrictor of the turbine assembly, the variable flow-restrictor comprising a first series of angularly-distributed flow-restrictor portions distributed around a turbine wheel and a second series of angularly-distributed flow-restrictor portions distributed around the first series, and a control system for controlling the speed and position of the first and second series based on the sensed engine characteristics.

In this embodiment, the inner disc 103 is fixed relative to the turbine housing 105 whereas the outer disc 101 is rotatable about its axis relative to the turbine housing 105. Thus, the outer disc 101 is rotatable relative to the inner disc 103 so as to vary the relative angular positions of the two discs 101, 103. In other embodiments, the relative angular position may be varied by providing a rotatable inner disc and a fixed outer disc or by providing an inner and outer disc that are both rotatable. Returning to the present embodiment, the outer disc 101 is rotatable by mechanically coupling the outer disc 101 to the crankshaft of the engine 210 of the vehicle 200 to which the turbocharger 220 is fitted, as shown in FIG. 5. That mechanical coupling is such as to rotated the outer disc 101 in dependence on crankshaft speed and angle and in order to relative position the inner and outer discs 101, 103 to achieve the method of operation described below with reference to FIGS. 4a to 4c. In some embodiment, it is envisaged that apparatus may be arranged to advance or retard operation of the outer disc 101 based on crankshaft speed if necessary.

Each disc 101, 103 has a flat, annular, body portion that lies in a radial plane and so to be aligned with the radially outer part of the body portion 99 of the rotor 100. As will be understood, this is to guide flow to the rotor 100. One its body portion, each disc 101, 103 also has a series of angularly distributed and spaced-apart projections that project in an axially direction from one face of the disc 101, 103.

The projections project in the same axial direction as the vanes 98 on the rotor 100. The projections 102 on the outer disc 101 are each in the form of a leading part of an aerofoil section. The projections 104 on the inner disc 103 are each in the form of a trailing part of the same aerofoil section. All the aerofoil sections 102, 104 are arranged with their span in an axial direction, that is perpendicular to the direction of exhaust gas flow. The aerofoil sections 102 on the outer disc 101 and the aerofoil sections 104 on the inner disc 103 are arranged such that each of a number of relative angular positions (that number being equal to the number of aerofoil sections on each disc), the inner aerofoil sections 104 and the outer aerofoil sections 102 align to form a continuous aerofoil section made up of an aligned leading part and trailing part. In this relative position, as will be explained below, the inner and outer discs 101, 102 cooperate to give a minimum level of flow-restriction to exhaust gas flowing to the rotor 100. Thus, this can be considered a "fully open" position. At all relative angular positions between these fully open positions, the aerofoil sections 102 on the outer disc 101 are out of alignment with aerofoil sections 104 on the inner disc 103. This gives rise to restriction of the exhaust-gas flow to the rotor 100. At relative angular positions half-way between adjacent fully open positions, the misalignment between the two sets of aerofoil sections 102, 104 is at a maximum and so this can be considered a "fully closed" position, even if, as in this embodiment, the misaligned sections 102, 104 do not entirely block the flow.

Operation of the turbocharger will now be described with reference to FIGS. 4a to 4c. In FIG. 4a at the start of the exhaust process, exhaust valve 301 is open and allows the exhaust gas to escape from the engine cylinder 300. At this time, the aerofoil sections 102 on the counter-clockwise rotating outer disc 101 are out of phase with the aerofoil sections 104 on the inner disc 103. Thus, minimum turbine inlet flow area is provided, which gives rise to maximum exhaust energy recovery. At the time represented by FIG. 4b, inner aerofoil sections 104 and outer aerofoil sections 102 are aligned for fully open exhaust flow passage area. This allows the already high energy flow to be retained without the need for the flow pressure to increase further. At the time represented by FIG. 4c, it can be seen that the continuous rotation of the outer disc 101 has again given rise to alignment of the position of each outer disc aerofoil sections 102 with the next respective inner disc aerofoil section 104 such that the aerofoils of the two discs are aligned at the end of the exhaust process when the exhaust gas pressure levels have returned to approximately their initial values.

In embodiments, it is envisaged that the active flow control techniques described in WO2006/061588 may be used to control the present turbocharger. It is also envisaged that there are several viable variations to the operative parts of the system. These variations are described below.

In terms of the choice of discs available for rotation these can be either: a rotatable outer disc 101 with the inner disc being non-rotatable (a continuous or attached part of the turbine housing 105); a rotatable inner disc 103 with the outer disc being non-rotatable (a continuous or attached part of the turbine housing 105); or both discs can be rotatable with this option allowing a reduction of the requirement for a high disc rotational speed.

In terms of rotation direction, the rotating disc or discs can have a clockwise or counter-clockwise direction of rotation. Counter-rotation of the inner and outer discs is a third option for a higher reduction in the required rotational speed of both discs.

In terms of the shape of the flow restricting members, these can have the previously-described aerofoil shape for higher efficiency or any shape deemed necessary provided there is a rotating overlap between the two concentrically disposed array of flow restricting members. That overlap may be continuous or discontinuous throughout the rotation. The aerofoil sections detailed in FIGS. 1, 2 and 3 are in alignment when disposed such that their aerodynamic cord lines are substantially aligned. The two parts (leading and trailing) of the same aerofoil section may be arranged with the leading part rigidly attached to the outer disc 101 and the trailing part rigidly attached to the inner disc 103. Since the geometrical thickness of the aerofoil sections describe a fixed level of flow restriction or minimum turbine inlet flow passage area, either or both of the outer 102 or inner disc aerofoils 104 can be coupled to a pivoting vane mechanism such as found in a conventional VGT equipped with an array of pivoting vanes, in order to provide a level of variability of the minimum turbine inlet passage flow area. In addition, the flow restricting members (aerofoil sections in the arrangements described above) need not align to one another of it is deemed advantageous to have a different geometrical relations between the two aerodynamic surfaces.

In terms of the actuator driving system (FIG. 5) this can be either an actuator 230 of any type suitable to provide the necessary rotatable disc rotational speed. In this regard, actuators known to provide such capability have included electric servo motors, electromagnetic actuators, hydraulic or electro-hydraulic actuators as well as pneumatic actuators. Thus, the disc or discs that are rotatable relative to the turbine housing may not be driven by being coupled to the crankshaft and driven thereby. Instead, the or each disc may be driven by an actuator such as that listed above, based on the sensed position and speed of the crankshaft.

Referring again to FIG. 5, it will be understood that, in overview, at least certain embodiments provide two concentric discs 101,103 on the circumference of each of which are rigidly-attached, flow-restricting aerofoil sections. At least one of the discs 101,103 is rotatable and the interaction of the two arrays of aerofoil sections creates a periodically variable turbine inlet passage area profile matched to the pressure profile of the incoming exhaust gases, emanating through the engine exhaust valves and entering a turbocharger turbine disposed immediately downstream of the discs. The discs 101,103 are disposed within a turbine housing, between a primary exhaust gas source and the turbine blades. At least one of the discs 101,103 is attached at the back of the turbine housing to a driving mechanism which creates rotating motion. The driving mechanism can consist of any number of actuator types 230 capable of providing adequate rotational speed such that the frequency of the passing exhaust gas through the aerofoil sections matches the passing frequency of adjacent aerofoil sections. Sensors are provided to monitor mass flow rate and pressure levels at the inlet, and to measure the rotational speed of the flow restricting member. This information is routed to a controller 240 which undertakes to phase the motion of the rotatable disc with the frequency of the exhaust gas pulses. As a result there is provided a system and method for providing active control of the pulsating exhaust gas flow at the inlet of a turbocharger turbine for use in internal combustion engines, and in particular taking into account the effect of opening and closing of the engine exhaust valves. In other embodiments, other arrangements are envisaged.

The invention claimed is:

1. A variable flow-restricting turbine assembly for a turbocharger, the assembly comprising a housing, a turbine mounted for rotation in the housing, and a variable flow-restrictor; wherein the variable flow-restrictor comprises a first series of angularly-distributed flow-restrictor portions distributed around a turbine wheel and located in an exhaust flow path to the wheel, and a second series of angularly-distributed flow-restrictor portions distributed around the first series and located in the exhaust flow path, at least one of the first and second series being rotable in the housing to vary relative angular positions of the first and second series, and the restrictor portions arranged such that the first portions align with the second portions at each of a plurality of relative angular positions to open flow channels between the portions and such that they misalign between those positions to close the flow channels, wherein the at least one of the first and second series that is rotatable in the housing is rotated with an actuator comprising one of an electric motor, an electromagnetic actuator, a hydraulic actuator, an electro-hydraulic actuator and a pneumatic actuator, and wherein the actuator is arranged to rotate each of the first and second series at a frequency that is proportional to a frequency of exhaust pulses from an engine to which the turbocharger is to be coupled.

2. The variable flow-restricting turbine assembly according to claim 1, wherein the first series of flow-restrictor portions are termed the first portions, the second series of flow-restrictor portions are termed the second portions, and the first portions and the second portions are each sections of an aerofoil.

3. The variable flow-restricting turbine assembly according to claim 2, wherein the second portions are each a leading part of an aerofoil section and the first portions are each a trailing part of an aerofoil section.

4. The variable flow-restricting turbine assembly according to claim 3, wherein the leading parts and trailing parts are of the same aerofoil section.

5. The variable flow-restricting turbine assembly according to claim 2, wherein the first and second portions are arranged such that when in alignment each first portion aligns with a respective second portion to form a respective aerofoil section and the flow channels are defined between adjacent aerofoil sections.

6. The variable flow-restricting turbine assembly according to claim 1 wherein a number of portions in the first series is equal to a number of portions in the second series.

7. The variable flow-restricting turbine assembly according to claim 1, wherein the at least one of the first and second series that is rotable in the housing is mounted on a carrier for rotation.

8. A turbocharger comprising the turbine assembly according to claim 1.

9. The variable flow-restricting turbine assembly according to claim 1, wherein the rotation is continuous rotation in one direction.

10. An engine comprising a turbocharger comprising a variable flow-restricting turbine assembly, the assembly comprising a housing, a turbine mounted for rotation in the housing, and a variable flow-restrictor; wherein the variable flow-restrictor comprises a first series of angularly-distributed flow-restrictor portions distributed around a turbine wheel and located in an exhaust flow path to the wheel, and a second series of angularly-distributed flow-restrictor portions distributed around the first series and located in the exhaust flow path, at least one of the first and second series being rotable in the housing to vary relative angular positions of the first and second series, and the restrictor portions arranged such that the first portions align with the second portions at each of a plurality of relative angular positions to open flow channels between the portions and such that they misalign between those positions to close the flow channels wherein the at least one of the first and second series that is rotatable in the housing is rotated with an actuator comprising one of an electric motor, an electromagnetic actuator, a hydraulic actuator, an electro-hydraulic actuator and a pneumatic actuator, and wherein the actuator is arranged to rotate each of the first and second series at a frequency that is proportional to a frequency of exhaust pulses from an engine to which the turbocharger is to be coupled.

11. The engine according to claim 10, wherein the first and second series are each rotated with an actuator comprising a mechanical coupling assembly coupled to a rotating part of an engine to which the turbocharger is to be coupled, the mechanical coupling assembly arranged to rotate each of the series from the rotating part.

12. The engine according to claim 11, wherein the rotating part is a crankshaft or a camshaft.

13. The engine according to claim 10, further comprising a sensing system and a control system, the sensing system arranged to sense engine characteristics of the engine that are indicative of a timing and frequency of exhaust pulses, the control system arranged to control, based on the sensed engine characteristics, a rotational speed and position of the first and second series that are each rotated with an actuator.

14. A vehicle comprising an engine comprising a turbocharger comprising a variable flow-restricting turbine assembly, the assembly comprising a housing, a turbine mounted for rotation in the housing, and a variable flow-restrictor; wherein the variable flow-restrictor comprises a first series of angularly-distributed flow-restrictor portions distributed around a turbine wheel and located in an exhaust flow path to the wheel, and a second series of angularly-distributed flow-restrictor portions distributed around the first series and located in the exhaust flow path, at least one of the first and second series being rotable in the housing to vary relative angular positions of the first and second series, and the restrictor portions arranged such that the first portions align with the second portions at each of a plurality of relative angular positions to open flow channels between the portions and such that they misalign between those positions to close the flow channels wherein the at least one of the first and second series that is rotatable in the housing is rotated with an actuator comprising one of an electric motor, an electromagnetic actuator, a hydraulic actuator, an electro-hydraulic actuator and a pneumatic actuator, and wherein the actuator is arranged to rotate each of the first and second series at a frequency that is proportional to a frequency of exhaust pulses from an engine to which the turbocharger is to be coupled.

* * * * *